June 29, 1926.

L. D. KELLOGG

IGNITION SYSTEM

Filed July 27, 1921

Inventor:
Leroy D. Kellogg
By Curtis B. Camp
Attorney.

June 29, 1926.

L. D. KELLOGG

IGNITION SYSTEM

Filed July 27, 1921

Inventor:
Leroy D. Kellogg
By Curtis B. Camp
Attorney.

Patented June 29, 1926.

1,590,631

UNITED STATES PATENT OFFICE.

LEROY D. KELLOGG, OF DEERFIELD, ILLINOIS, ASSIGNOR TO KELLOGG SWITCHBOARD AND SUPPLY COMPANY, OF CHICAGO, ILLINOIS, A CORPORATION OF ILLINOIS.

IGNITION SYSTEM.

Application filed July 27, 1921. Serial No. 487,834.

My invention relates to current controllers, and more particularly to the so-called ignition distributers for internal combustion engines, and is particularly intended for use in engines such as are used in automobiles or the like.

In the ignition system of an automobile engine, the ignition circuit is controlled by a switch known as an ignition switch and is provided with an on and off position, and which, when moved to its on position, closes the ignition circuit and through the agency of a distributer of the above type, which is driven by the engine through suitable connecting mechanism, distributes the current to the various spark plugs of the automobile engine. The switch, when in its off position, opens the ignition circuit and may be locked through a suitable locking mechanism against operation to prevent an unauthorized person closing the ignition circuit and using the automobile, and an object of my invention is the provision of an additional ignition circuit closing and opening switch in association with the distributer, which is automatically closed when the distributer shaft is rotated.

In ignition systems of the above type a starting pedal is provided which is under the control of the operator, and which, when actuated, closes a circuit through the starting motor to turn over the engine. This motion is transmitted to the distributer shaft through suitable connecting mechanism, and means operatively associated with said distributer shaft automatically closes the battery switch associated with the distributer to cause the functioning of the engine. This circuit switch is also automatically opened when the distributer shafts stop rotating due to the stopping of the engine.

One of the features of my invention is the provision of a cam driving connection between the distributer shaft and an auxiliary shaft which controls the automatic closing and opening of the ignition circuit switch associated with the switch. This ignition circuit switch is closed as soon as the engine is turned over by the starting motor and remains closed while the engine is running to maintain the battery circuit. Should the driver stop the engine or stall it and forget to turn off the ignition switch, the stopping of the engine will prevent further rotation of the distributer shaft and thus permit the battery switch associated therewith to automatically open the said battery circuit, thus preventing any drain of the battery while the engine is not running.

The above features, as well as others, will be more fully hereinafter described in the ensuing specification.

For a more complete understanding of my invention, reference may be had to the accompanying drawings, in which like reference characters in the several views denote like parts, and in which Fig. 1 is a longitudinal sectional view of the combined timer distributer and ignition switch cut-off of my invention;

Figure 2:
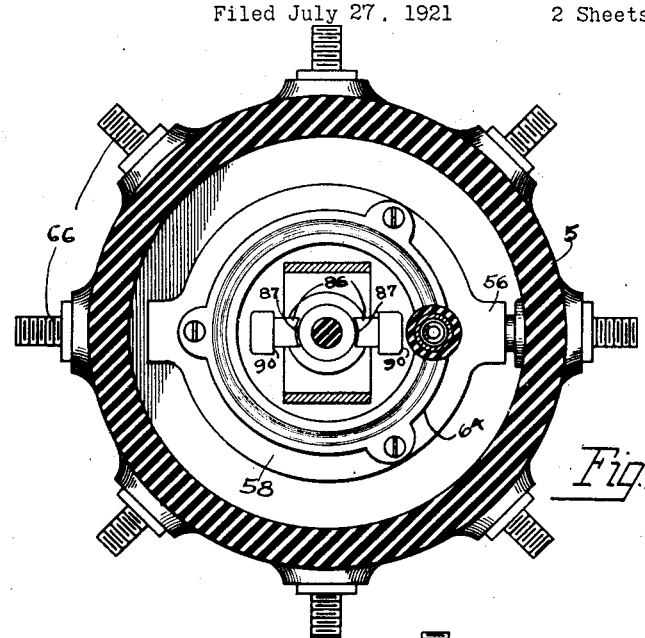
Fig. 2 is a sectional view along the line 2—2 of Fig. 1.
Figure 1:
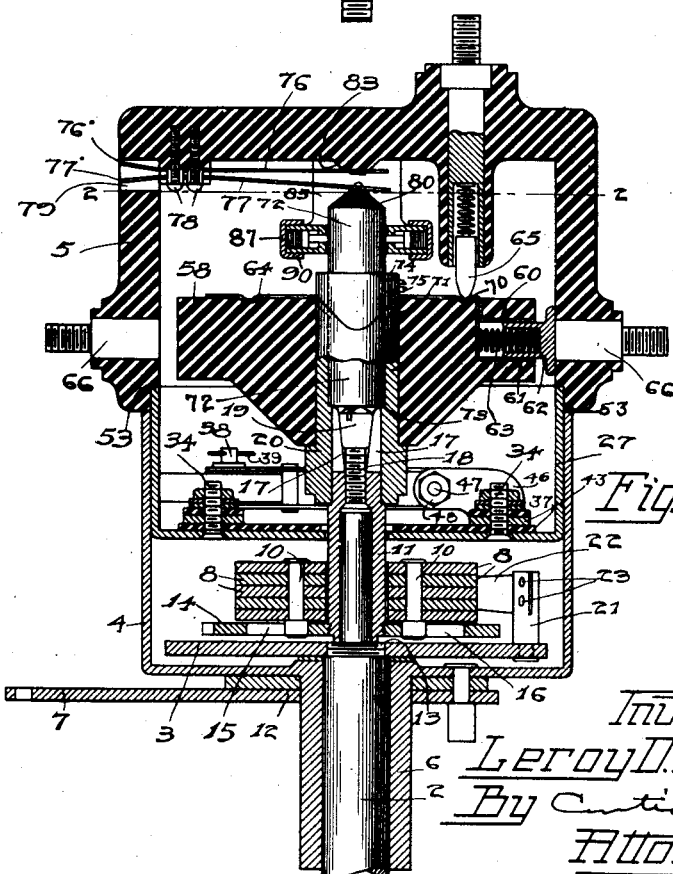
Figure 3:
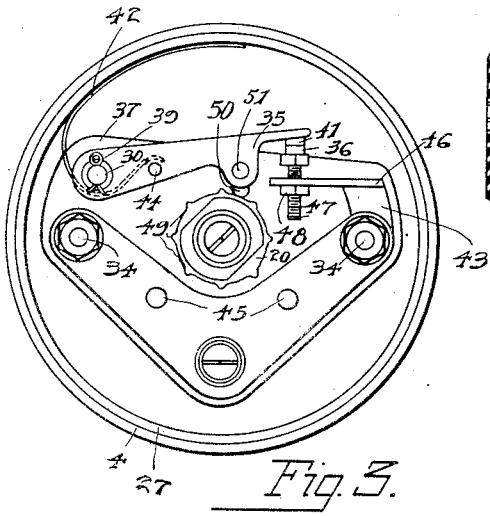
Fig. 3 is a view with the distributer cap and disk removed to more clearly illustrate the timer and timer contacts.

Referring to the accompanying drawings, the mechanical construction of these parts including the timer cam and the distributer mechanism embodied compactly in one piece of apparatus, will now be described.

The driving shaft 2 is suitably connected to the engine shaft and geared to the proper ratio of movement to operate the timer and distributer in proper cycle. The upper end of the driving shaft 2 is reduced and threaded to receive a circular plate 3 that carires the mechanism that operates to automatically advance the spark as the speed of the driving shaft is increased. The circular plate member 3, as well as the rest of the mechanism that forms the combined timer and distributer is carried in a cup-shaped containing member 4 which is provided with an inverted cup-shaped cap 5 formed of insulating material. The cup 4 is provided with an integrally formed sleeve member 6 through which the shaft 2 extends and which is adapted to set in a bearing (not shown) on the engine base, so that it may be rotatably advanced or retarded through a manual connecting link which is connected to the plate 7 that is riveted to the bottom of the cup casing 4. The plate 7 and its connecting links forming manual means to rotate the cup casing 4 in turn rotating the cap 5 in which are embedded the terminals 66, thereby advancing or retarding the spark that the distributer furnished to the engine.

The weighted members 8 consist of laminations of sheet metal which are pivoted diametrically opposite each other to the circular plate 3 by means of suitable pivot pins that are secured to the said circular plate 3. The free ends of the weighted members extend inwardly and are each provided with a semi-circular recess to permit the end of the shaft 2 to exend therethrough. The weighted laminated members are held together by means of rivets 10, two of said rivets being provided with extended end portions for purposes hereinafter to be described. Fitting loosely over the extended end of the shaft 2 is a surrounding sleeve 11 that has a bearing surface adapted to engage the shoulder 13 of the shaft 2. The lower end of the sleeve 11 is threaded to receive an irregularly shaped advancing plate member 14. Cut in the plate member 14 is a pair of slots 15 and 16 that are adapted to receive the extended ends of two of the rivets 10 to limit the movements of the weighted members 8. The uper end of the sleeve member 11 is reduced and provided with transverse slots 17 so that when the screw 18, which is provided with a tapered head 19, is tightened, the timer cam 20 is securely held in its place upon the said sleeve 11 due to the forcing out of the split portions of the sleeve 11. A pair of studs 21 are securely staked to the plate 3 and are provided with transverse slots to receive the ends of a pair of leaf springs 22. Screws 23 are provided to securely hold the leaf springs 22 to the staked studs 21. The free extremities of the springs 22 engage suitable ears formed integrally with the middle one of the laminations of the weighted members 8 and operate to hold the said weighted members in their normal position. A circular cup-shaped member 27 for carrying the interrupter contacts fits within the outer inclosing cup 4, and insulatingly secured to the inner surface of the cup 27 by means of bolts 34 are the interrupter contacts 41 and 36.

The triangularly shaped mounting plate 37 which carries the contacts 41 and 36 is preferably made of some insulating material such as hard rubber or some other composition. Secured to this plate 37 is a post 38 on which is pivotally mounted the contact arm 35 that carries contact 41. A cotter pin 39 is passed through a transverse slot in the said post 38 to hold the contact arm in position. A leaf spring 42 is provided with a hooked end that engages a pin 44 in the arm 35 and is then bent around the pivot post 38 and contacts the inner cylindrical surface of the cup 27 to provide tensioning means for yieldingly holding contact arm 35 in its normal position. A plate member 43 is securely held to the plate 37 by means of the bolts 34 and rivets 45 and is provided with an upturned end portion 46 for holding the contact 36. The upturned portion 46 is tapped and threaded to receive a screw member 47 that carries the contact 36, and a locking nut 48 is provided to hold the screw member 47 in its adjusted position.

The timer cam 20 is provided with a number of ribs 49, equal in number to the number of cylinders of the internal combustion engine. The ribs 49 are adapted to contact with the nose of a fiber member 50, securely fastened to the contact arm by means of rivets 51, to open and close the contacts 41 and 36 as the distributer shaft is revolved. The cover cap 5, which is made of insulating material as hereinbefore mentioned, is provided with an inner annular recess 53 which is adapted to fit over the upper edge of the cup member 27 and abut against the upper edge of the casing 4. A circular distributing disk member 58 is provided with a central orifice 59 for securing it to the timer cam 20 so that when the timer cam is rotated the disk 58 is rotated therewith. A cylindrical recess 60 is cut in the face of the projecting lugs 56 of the disk 58, into which is fitted a cylindrical member 61. A contact button 62 provided with a flattened circular member is adapted to fit within the cylindrical member 61, and a spring 63 is provided which exerts tension upon the contact button 62 in an outward direction to keep it in contact with the terminals 66 of the head 5. A metallic ring 64 is secured to the upper face of the disk 58 and forms electrical connecting means from the contact button 62 to a contact point 65 which is carried by the distributer head 5.

A plurality of contact terminal studs 66 extend through the side wall of the distributer head 5 into position to be engaged by the contact button 62 as the disk 58 is rotated, the contact terminals 66 corresponding in number to the number of cylinders of the internal combustion engine. The threaded ends of the terminals 66 constitute the secondary terminals that connect to the cylinders that contain the explosive mixture ready for firing. At the same time that the contact button 62 is rotated over the contact ends of the terminals 66, the timer cam 20 is, of course, operating the make and break device to cause the impulses to be sent through the primary winding of an induction coil.

The timer cam 20 is provided with an integrally formed sleeve extension 70, which extends through a central orifice 71 in the disk member 58. The sleeve extension 70 is provided with a central orifice 71 to permit access to the screw 18, and it also forms a bearing for an auxiliary shaft 72 which is received in the said opening 71 and which when in position rests against the shoulder 73 in the opening 71. A collar 74 is suitably secured to the auxiliary shaft 72 by means of a set screw 75 and is operatively and rotatably associated with the sleeve extension 70 of the timer 20 through the agency of a cam acting drive connection. A pair of normally open spring contacts 76 and 77 are suitably secured to the inner face of the cap 5 by means of the screws 78 and terminals 76' and 77' for the said terminals extend through a suitable opening 79 in the cap 5 to permit external leads to be connected with the said terminals. The upper end of the auxiliary shaft 72 has secured thereto a conical shaped button 80 of suitable insulation material, which is in engagement with the spring 77 at all times, and the tension of the spring 77 is such as to hold the auxiliary shaft 72, and the collar 74 as a whole in the position clearly illustrated in Fig. 2.

Referring now to the operation of the device, when the shaft 2 is rotated, due to its connection to the shaft of the engine the circular disk 3 which is attached thereto is rotated and the free ends of the weight members 8, due to centrifugal force, are forced outwardly against the tension of the leaf springs 22. The rotation of the weighted members 8 rotates the surrounding sleeve 11 which carries the timer cam 20 (through the medium of the extended ends of the pins 10 and the plate member 14.) The rotation of the timer cam 20 operates to interrupt the timer contacts 36 and 41 to make and break a circuit through the primary of the induction coil. The rotation of the cam member 20 also causes the distributing disk 58 to be rotated, thereby causing the contact button 62 to make contact with the contact studs 66, thereby distributing the secondary currents to the different cylinders of the combustion engine. As the speed of the distributer shaft is increased, the weighted members are forced farther from their normal position, causing the pins 10 to move outwardly in their grooves 15 and 16, thereby causing the plate member 14 to advance the surrounding sleeve 11 which in turn advances the timer contacts, thereby causing the timer contacts to be operated to transmit an impulse to the primary of the induction coil in advance of the impulses that would have been transmitted had the timer cam not been advanced. Conversely, as the speed of the distributer shaft is decreased the weighted members are forced inwardly by the leaf springs 22, thus causing the timer cam to be moved backwardly in relation to its position with the distributer shaft, thereby retarding the spark. For a more clear and detailed description of a distributer of this type, reference may be had to a patent issued to William Kaisling and bearing Patent No. 1,363,512.

The shaft 2 is rotated and this rotation is transmitted to the timer 20 as just described, and due to the cam acting drive connection between the sleeve extension 70 of the timer 20 and the collar 74 secured to the shaft 72, the said collar 74 and shaft 72 as a whole is raised against the normal tension of the spring 77 due to the cam surface 81 of the sleeve extension 70 acting against the cam surface 82 of the collar 74 and the tendency of the friction member 87 to retard the rotation of the shaft 72. The upward movement of the collar 74 and shaft 72 as a whole in the orifice 71 is limited as the upward movement of the auxiliary shaft 72 forces the spring 77 into engagement with the spring 76, which spring 76 rests against stop 83 integrally formed with the cap 5. The collar 74 and shaft 72 as a whole is rotated with the timer 20 due to this cam acting drive connection, and to assure proper actuation of the drive connection, I provide friction means upon shaft 72.

Figure 4:
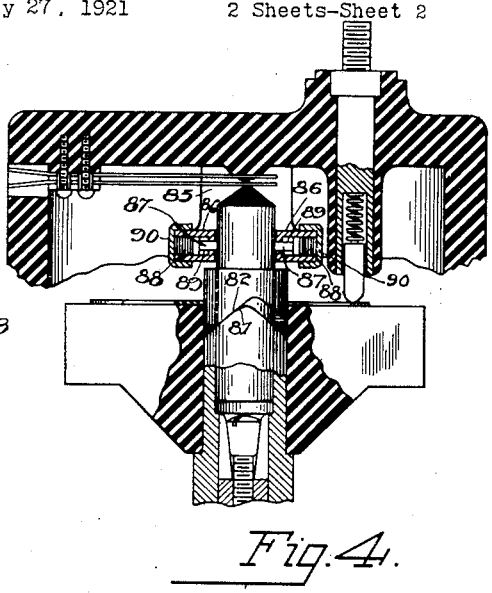
Fig. 4 is a view of the upper portion of the distributer and ignition switch cut-off showing the device of my invention in its actuated position.

A bracket 85 (Fig. 4) is provided which is supported by the cap 5 and has integrally formed therewith cylindrical members 86 diametrically opposite, and which carry spring-pressed friction members 87 which engage the auxiliary shaft 72. Coil springs 88 rest in the openings 89 of the cylindrical members 86 and suitable caps 90 having screw-threaded engagement with the threaded ends of the cylindrical members 86 hold the friction members 87 and springs 88 in place; the said spring pressing the friction members 87 against the shaft 72. The collar 74 and shaft 72 as a whole remain in this raised position as long as the shaft 2 is rotating, as clearly illustrated in Fig. 4. Now, when the engine is stopped the shaft 2 stops rotating, and the tension of the spring 77 is such as to force the collar 74 and shaft 72 as a whole in a downward direction against the friction of friction members 87 into the position illustrated in Fig. 2, and to again permit the contacts to assume their normal open position.

Figure 5:
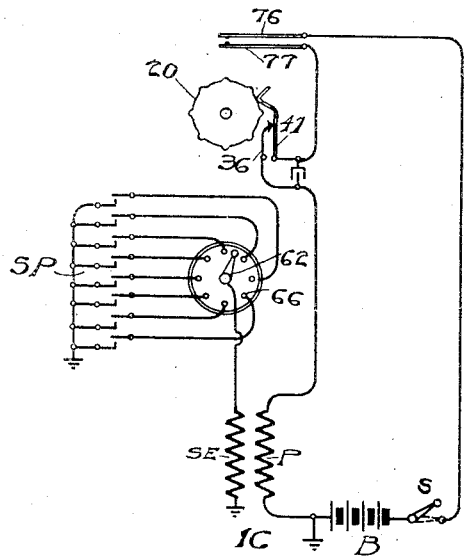
Fig. 5 is a simplified circuit diagram showing the ignition switch cut-off of my invention applied to an ignition system of an engine.

Referring now to Fig. 5, I illustrate a simplified ignition circuit arrangement operating in connection with my invention, and for the purpose of description assume that the operator closes the ignition switch S and then depresses the starting button to turn over the engine. For a clearer understanding of a switch of this type reference may be had to a patent issued to William Kaisling and bearing Patent No. 1,360,411. The engine is turned over through the agency of the starting motor, and this motion is transmitted to the distributer shaft 2, as before described, and the rotation of the shaft 2 causes the collar 74 and shaft 72 as a whole to be moved upward due to the cam acting drive connection against the tension of the spring 77 to close the contacts 76 and 77, to close the battery circuit and to permit the same to be distributed to the spark plugs through the agency of the distributer and timer. When the contacts 76 and 77 are closed through the agency of the battery B through the now closed switch S, through the closed contacts 76 and 77, timer contacts 41 and 36, through primary P of the induction coil IC to ground. This flow of current through the primary winding P induces a flow of current into the secondary SE of the coil IC, and the instant the contacts 36 and 41 are opened due to the rotation of the timer 20 the button 62 of the distributer disk 58 engages a terminal 66, and this induced current into the secondary winding SE of the coil IC is transmitted to the proper spark-plug SP, as is well known in the art. As long as the engine is running the contacts 76 and 77 are closed to maintain the battery circuit of the ignition system of the engine. Now, when the engine is stopped the shaft 2 of the distributer stops rotating and the tension of the spring 77 now forces the shaft 72 and collar 74 downward, permitting the contacts 76 and 77 to open the battery ignition circuit and prevent a drain upon the battery, should the operator fail to open the ignition switch S.

From the foregoing it is thus seen that I have arranged my system so that whenever the engine stops functioning for any reason whatever, the ignition circuit is immediately opened to prevent a drain of the battery.

While I have described one form of mechanism well adapted to accomplish the objects sought, it is to be understood that various other forms might be utilized to accomplish the desired results. Therefore, I do not wish to be limited to the exact structure as shown, as many changes and modifications may readily suggest themselves, but I aim to cover all such changes and modifications as come within the spirit and scope of the appended claims.

What I claim as new and desire to secure by United States Letters Patent, is:

1. In an electric current controller of the character described, the combination of a rotary device, including a cover cap, a pair of normally open spring contacts secured thereto, a rotatable shaft, a sleeve member, a second shaft having a collar secured thereto for engaging said sleeve member, said second shaft mounted in association with said first shaft by said sleeve member, a friction member for said second shaft secured to said cover cap, said second shaft adapted to be moved away from said first shaft by the cooperation of said sleeve member and said collar and by said friction member to close said contacts when said first shaft is rotating, and also adapted to be returned to normal position by spring tension when rotation ceases.

2. In a device of the character described, including a cup member having an orifice, a driving shaft extending through said orifice, a cover cap having a friction member secured thereto, a pair of contact springs, a sleeve member, an auxiliary shaft engaging said sleeve member and associated with said driving shaft, said auxiliary shaft being held in position by said friction member and one of said contact springs and adapted to be moved away from said driving shaft through the cooperation of said sleeve member and said collar and by said friction member when the said device is in operation, and adapted to be returned to normal by one of said contact springs when said device is at rest.

3. In a device of the character described, including a rotary device comprising a cup provided with an orifice, a cover cap for said cup, a rotatable shaft extending inwardly into said cup through said orifice, a cam member having an integrally formed extension and a central orifice extending therethrough, an auxiliary shaft engaging said central opening and associated with said rotatable shaft, a pair of normally open spring contacts having terminals and secured to said cover cap, said spring contacts being automatically closed when said shafts are in rotary motion and automatically opened when said shafts are at rest.

4. In an electric current controlling mechanism of the character described, including a rotary device, a driving shaft therefor, a cam member having an integrally formed extension provided with a central orifice throughout and associated with said driving shaft, said extension having a convex shaped end, a set of normally open contacts, an auxiliary shaft associated with said driving shaft, a friction member for retarding the rotation of said auxiliary shaft, a collar having a concave shaped end secured to said auxiliary shaft, said auxiliary shaft engaging the central orifice in said cam member and said concave shaped end of said collar engaging said convex shaped end of said cam member, said auxiliary shaft adapted to be moved away from said driving shaft through the cooperation of the concave and convex ends of said collar and said cam member, and by the retardation of said auxiliary switch by said friction member to close said contacts when said driving shaft is rotating.

5. A device of the character described including a rotary device provided with a driving shaft, a cam member having an integrally formed sleeve extension, an auxiliary shaft having a collar secured thereto, a friction member for retarding the rotation of said auxiliary shaft, said auxiliary shaft being associated with said driving shaft and said collar being in engagement with said sleeve extension, said auxiliary shaft adapted to move away from said driving shaft through the cooperation of said collar and said sleeve extension and by said friction member when said driving shaft is in motion and also adapted to move back to its normal position when said driving shaft ceases rotating.

6. A device of the character described including a driving shaft and a sleeve member associated therewith, an auxiliary shaft having a collar secured thereto, said auxiliary shaft and collar being in association with said driving shaft and said sleeve member, a set of normally open contact springs, a friction member associated with said auxiliary shaft, said auxiliary shaft adapted to move away from said driving shaft through the cooperation of said sleeve member and collar and said friction member when the driving shaft is in rotary motion, and also adapted to be moved to its normal position by one of said contact springs when said driving shaft is at rest.

7. An automatic circuit closing mechanism of the character described including a rotatable shaft, a second shaft having a collar secured thereto, a sleeve member for engaging said collar and associating said second shaft with said first shaft, a cover cap having a pair of open spring contacts and a friction member secured thereto, said second shaft adapted to move away from said first shaft through the cooperation of said sleeve and collar and said friction member to close said contacts when said first shaft is rotating, and adapted to be moved back to normal by one of said spring contacts when rotation ceases.

8. In a circuit closing device of the character described including a rotatable shaft and sleeve member, a second shaft having a collar secured thereto, said collar and second shaft being associated with said first shaft and sleeve, a pair of contact springs and a friction member associated with said second shaft, said second shaft being forced away from said first shaft by the cooperation and rotation of said sleeve member and said collar and the retardation of said second shaft by said friction member to close said contacts when said rotatable shaft is rotating and being forced back to normal by one of said contact springs when the mechanism is at rest.

9. A circuit closing device for combustion engines of the character described including a pair of shafts and cam means on said shafts for automatically closing a set of contact springs when the combustion engine is started, and automatic means for opening said set of contacts when the engine comes to rest without reversing the direction of rotation of the engine.

10. In a circuit closing device for combustion engines of the character described, a pair of contacts, a pair of shafts and cam means on said shafts and a friction device associated with one of said shafts for closing said pair of contacts, and automatic means including tension means for maintaining said contacts at normal during the non-operation of the engine.

11. An ignition system for combustion engines including a contact device, a pair of shafts and cam means for said shafts and a friction device associated with one of said shafts for automatically operating said contacts when the combustion engine is started, and spring tension means for returning said contacts to normal when said engine comes to rest.

12. An ignition device of the character described including contact means, mechanical means including a main shaft and an associated auxiliary shaft having inclined surfaces for operating said contact means, and spring means for returning said contact means to normal.

13. A system of the character described including ignition mechanism for an internal combustion engine, a contact device, a pair of shafts, friction means automatically controlled by the starting of the internal combustion engine for operating said contact means, cam means on said shafts for maintaining said contact device in operated position, and automatic means for returning said contact means to normal when said engine comes to rest.

Signed by me at Chicago, in the county of Cook and State of Illinois, this 25 day of July, 1921.

LEROY D. KELLOGG.